United States Patent [19]
Suh

[11] Patent Number: 5,634,798
[45] Date of Patent: Jun. 3, 1997

[54] COMPACT DISK PLAYER-INCORPORATED TELEVISION RECEIVER HAVING A MONITOR POWER CONTROL FUNCTION

[75] Inventor: Moon-hwan Suh, Seoul, Rep. of Korea

[73] Assignee: Samsung Electronics Co., Ltd., Kyungki-do, Rep. of Korea

[21] Appl. No.: 507,555

[22] Filed: Jul. 26, 1995

[30] Foreign Application Priority Data

Mar. 28, 1995 [KR] Rep. of Korea .................. 95-6753

[51] Int. Cl.$^6$ .................. G10H 1/36; H04N 5/765
[52] U.S. Cl. .................. 434/307 A; 434/308; 434/318; 348/725; 455/353; 84/610
[58] Field of Search .................. 434/118, 307 R–309, 434/312, 318, 362; 348/512, 515, 725; 380/15, 20; 360/33.1, 77.01; 340/825.2, 825.22, 825.69, 825.72, 825.76; 84/456, 477 R, 601–615, 625, 645; 455/353

[56] References Cited

U.S. PATENT DOCUMENTS

| | | | |
|---|---|---|---|
| 5,247,126 | 9/1993 | Okamura et al. | 434/307 A |
| 5,250,747 | 10/1993 | Tsumuar | 434/307 A |
| 5,397,853 | 3/1995 | Koguchi | 434/307 A |
| 5,496,178 | 3/1996 | Back | 434/307 A |
| 5,499,921 | 3/1996 | Sone | 434/307 A |
| 5,542,000 | 7/1996 | Semba | 434/307 A |

FOREIGN PATENT DOCUMENTS 6-27944 2/1994 Japan .................. 434/307 R

Primary Examiner—Joe Cheng
Attorney, Agent, or Firm—Sughrue, Mion, Zinn, Macpeak & Seas

[57] ABSTRACT

A compact disk player incorporated television receiver includes a television signal receiver, a compact disk player having a song accompaniment function, a video signal processor for selectively receiving and processing a video signal output by the television signal receiver or a video signal output by the compact disk player and displaying the processed signal on a monitor. The device also contains an audio signal processor and a power source for generating voltage signals to supply power to the television signal receiver, the monitor, and the compact disk player. Also, a television controller is provided for controlling the supply of the voltage signals by the power source depending on whether the device is operating in a television mode or compact disk mode. The device operates in a television mode or a compact disk mode based on control signals input via an instruction input unit. Accordingly, when an audio compact disk is being played by the compact disk player (i.e. the device is operating in the compact disk mode), a voltage signal is generated so that a monitor is turned on only when on-screen characters are being displayed and is turned off after the characters have been displayed for a predetermined period of time. Furthermore, the television controller controls whether the video signal processor and audio signal processor receive video and audio signals from the television receiver or the compact disk player.

24 Claims, 4 Drawing Sheets

COMPACT DISK PLAYER-INCORPORATED TELEVISION RECEIVER HAVING A MONITOR POWER CONTROL FUNCTION

BACKGROUND OF THE INVENTION

The present invention relates to a television receiver in which a compact disk player (CDP) is incorporated. More particularly, the invention relates to a device which combines a television receiver with a compact disk song accompaniment apparatus having a monitor power control function for reducing current consumption. Specifically, current is conserved by turning off the power of a monitor when the monitor is not used during a compact disk operation mode.

A compact disk (CD) song accompaniment apparatus (also called a CD-OK apparatus) is a device which displays lyrics or other images on a monitor while a song or other audio sounds are being played. Each compact disk for a CD-OK apparatus (also called a CD-OK compact disk) is capable of storing lyrics and other accompanying images for about 2,000 songs and can also store about 4,000 still background screen images. As a result, when a particular song is selected, the CD-OK apparatus reproduces the image and lyric data for a selected song and outputs the lyrics and images to a monitor to be overlaid on a selected background screen. If the CD-OK apparatus does not have a display unit, the reproduced video signal is output to an external television receiver via an external video jack, and the reproduced audio signal is output via an external jack to an external speaker. However, connecting the CD-OK apparatus to several external devices to generate the desired video and audio output is inconvenient.

Another device which is similar to a CD-OK apparatus is a karaoke television receiver. Karaoke television receivers have the capability of storing lyrics for about 400 songs as well as several tens of graphical images in a semiconductor memory device. However, the number of songs which can be reproduced is about one fifth that of the CD-OK apparatus, and only a few background graphics screens can be accommodated.

In addition to coping with external equipment and limited storage capacity, the wide variety of compact disk types now available on the market (e.g., a CD-digital audio, a CD-graphics (CDG) and a CD-video (CDV)) has also presented problems for CD-OK apparatuses. Specifically, a particular type of CD player is required to reproduce information stored on each type of compact disk. As a result, several compact disk players are needed to reproduce each type of disk, thereby increasing the associated cost for designing a comprehensive system. Also, use of multiple CD players increases the space needed to install the system and increases the amount of unsightly external connections between the various components. Furthermore, since each CD player is generally provided with an exclusive-use remote controller, multiple remote controllers are necessary to operate the system. Moreover, since several non-integrated components are necessary to create a comprehensive CD-OK system and since such components are not centrally controlled, power must be constantly supplied to each component. Accordingly, a significant amount of power is unnecessarily consumed.

SUMMARY OF THE INVENTION

In order to solve the above problems, it is an object of the present invention to provide a compact disk player (CDP) incorporated television receiver having a monitor power control function.

To accomplish the above object, a CDP-incorporated television receiver according to the present invention comprises: a television signal receiver, wherein said television receiver receives at least a television signal and extracts first audio and video signals from at least said television signal and wherein said television receiver outputs said first audio and video signals; a compact disk player having a song accompaniment function, wherein said compact disk player receives a first control signal from a television controller, receives a second control signal from an instruction input unit, and outputs a third control signal to said television controller, wherein said compact disk player determines if said first and second control signals respectively equal certain values, and wherein said compact disk player reads data from a compact disk and outputs second audio and video signals if said first and second control signals respectively equal said certain values; a video signal processor, wherein said video signal processor selectively receives said first video signal from said television signal receiver or said second video signal from said compact disk player as a received video signal, processes said received video signal into a final RGB signal, and displays said final RGB signal on a monitor; an audio signal processor, wherein said audio signal processor selectively receives said first audio signal from said television signal receiver or a certain audio signal as a received audio signal, processes said received audio signal into a processed audio signal, and outputs said processed audio signal via a sound converter and wherein said certain audio signal comprises at least said second audio signal from said compact disk player; a power source, wherein said power source receives AC power and generates a television power voltage signal for turning on said television signal receiver, a monitor heating voltage signal for turning on said monitor, and a compact disk power voltage signal for turning on said compact disk player; and said television controller, wherein said television controller controls an output of said television power voltage signal to said television signal receiver, said monitor heating voltage signal to said monitor, and said compact disk power voltage signal to said compact disk player based on whether said CDP-incorporated television receiver is operating in a television mode or a compact disk mode, wherein said CDP-incorporated television receiver operates in said television mode or said compact disk mode in response to a fourth control signal input via said instruction input unit, wherein said third control signal input by said television controller from said compact disk player conveys information including on-screen character data relating to a compact disk read by said compact disk player, wherein said monitor is turned on by said monitor heating voltage signal when an audio compact disk is read by said compact disk player and wherein said television controller outputs said on-screen character data relating to said audio compact disk to said audio video signal processor so that said on-screen character data is displayed on said monitor, and wherein said television controller turns off said monitor by commanding said power source to stop outputting said monitor heating voltage signal if said on-screen character data has been displayed for a predetermined period of time.

Since the supply of power to the monitor is controlled during the reproduction of an audio compact disk, the present invention can reduce unnecessary power consumption.

BRIEF DESCRIPTION OF THE DRAWINGS

The above objects and advantages of the present invention will become more apparent upon reading the following description of the preferred embodiment thereof with reference to the attached drawings in which.

DETAILED DESCRIPTION OF THE PREFERRED EMBODIMENTS

Figure 1:
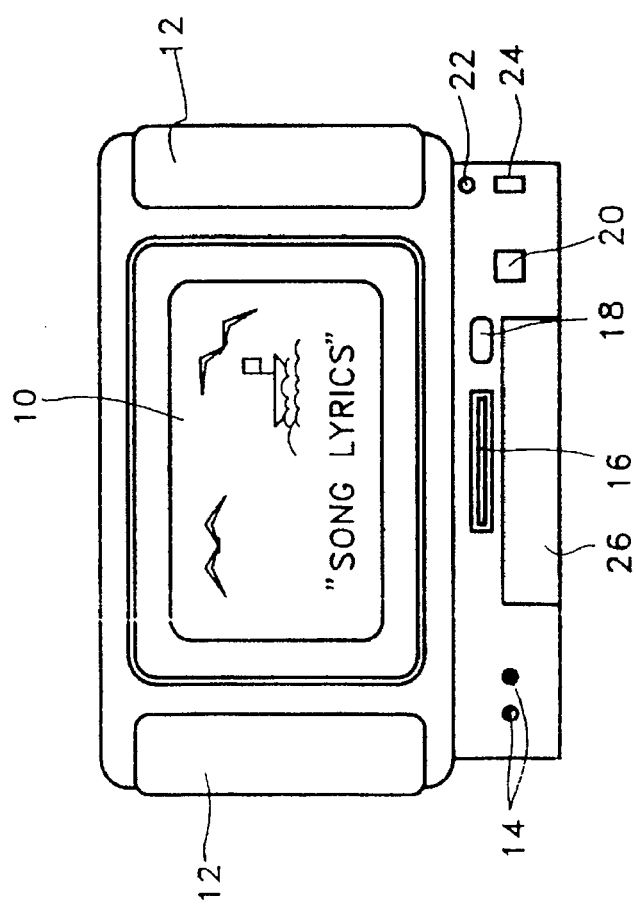
FIG. 1 is a front view of a CDP-incorporated television receiver according to an embodiment of the present invention.

One embodiment of a CDP-incorporated television receiver is shown in FIG.1. The CDP-incorporated television receiver comprises a CRT 10, a pair of speakers 12, a pair of microphone connecting jacks 14, a disk door 16 through which a CD is inserted or ejected, and an open/close button 18 for opening and closing the disk door 16. In addition, the device comprises a window 20 for receiving a control signal transmitted from a remote controller 27, a main power button 24 for turning the CDP-incorporated television receiver on and off, and a power indication lamp 22 for indicating whether the device is on or off.

Figure 2:
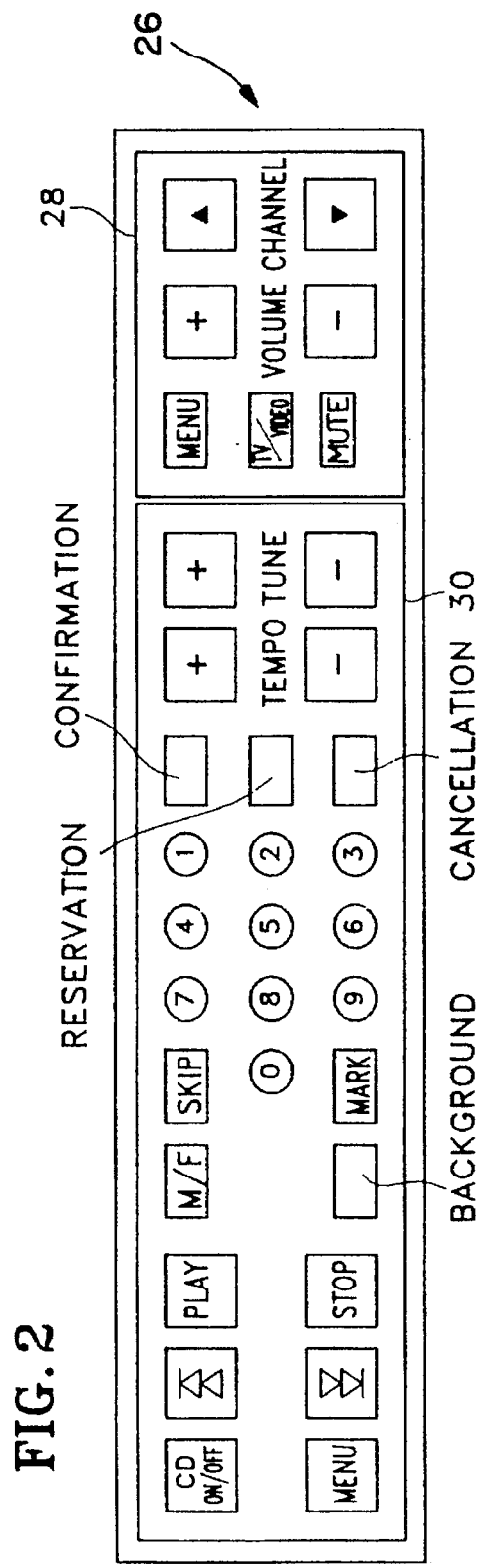
FIG. 2 shows the control panel of the CDP-incorporated television receiver shown in FIG. 1.

The CDP-incorporated television receiver also comprises a control panel 26 for inputting commands to the device. The control panel 26 is illustrated in greater detail in FIG. 2. As shown in the figure, the keys of the panel 26 are classified into a television control key portion 28 and a CD control key portion 30.

The television control key portion 28 includes a channel up/down key, a volume up/down key, a menu key, a TV/Video key, and a mute key. The CD control key portion 30 includes a tone up/down key, a tempo up/down key, a confirmation key, a reservation key, a cancellation key, numerical keys (0–9), a skip key, a score display or mark key, a male/female (M/F) discrimination key, a background selection key, a play key, a stop key, a selection up/down key, a CD on/off key, and a menu key.

Figure 3:
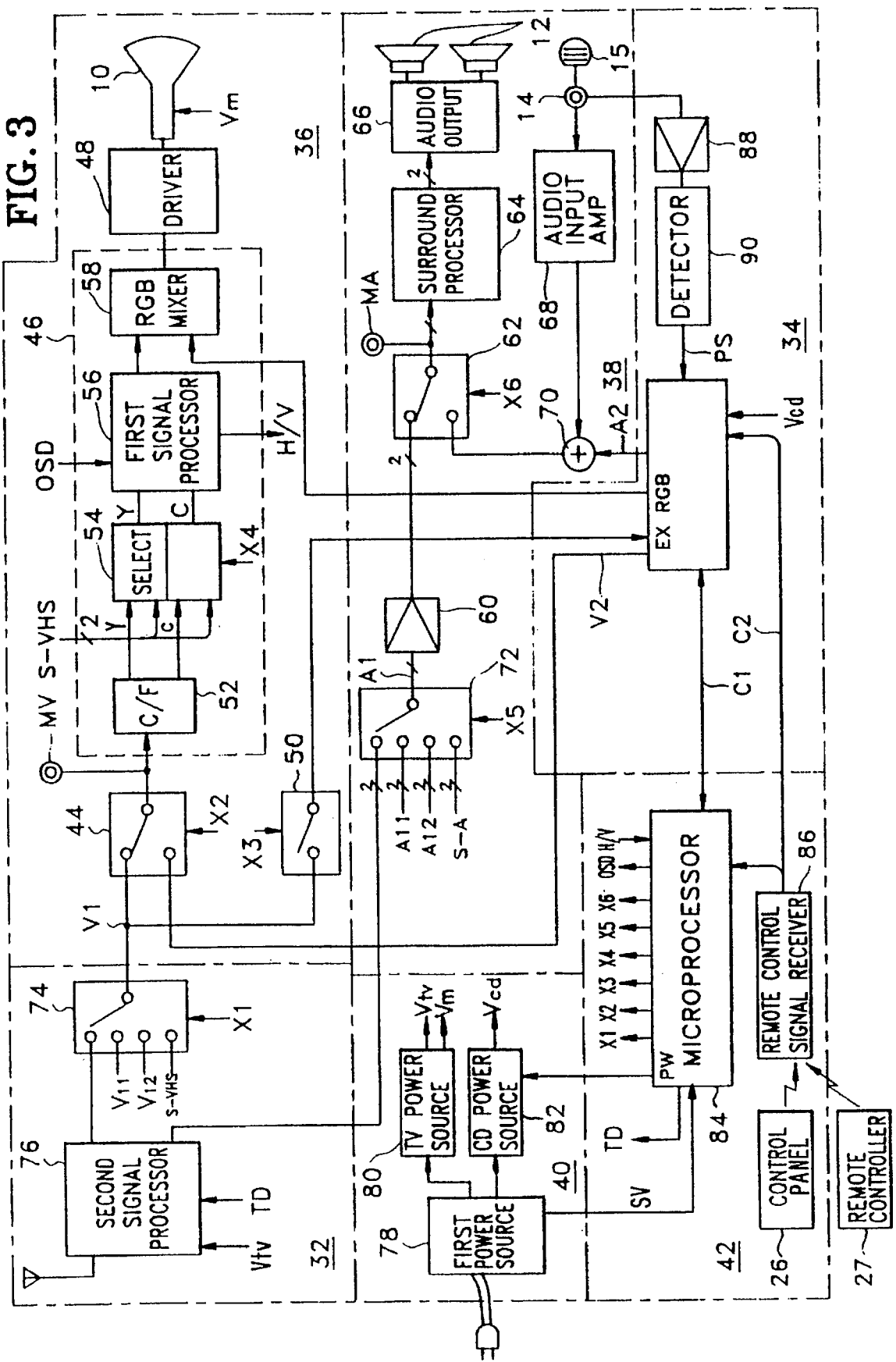
FIG. 3 is a circuit diagram of the CDP-incorporated television receiver according to one embodiment of the present invention.

FIG. 3 is a circuit diagram of the CDP-incorporated television receiver according to a preferred embodiment of the present invention. The apparatus shown in FIG. 3 comprises a television signal receiver 32, a compact disk (CD) player 34, a video signal processor 36, an audio signal processor 38, a power source 40, and a television controller 42.

The television signal receiver 32 receives a selectively tuned television signal and extracts a video signal and an audio signal from the received signal. The video and audio signals are selectively output to the video signal processor 36 and the audio signal processor 38, respectively.

The CD player 34 reproduces audio and video signals stored on compact disks and has the ability to synchronize the output of visual lyrics and other graphical images with the reproduced audio signals. The CD player 34 receives first and second control signals C1 and C2 from the television controller 42, and if the two control signals C1 and C2 are identical, the player 34 reads data from at least one type of compact disk and outputs a video signal V2 and an audio signal A2.

The control signals C1 and C2 may be pulsed logic commands which are compared by the CD player 34 to determine if the CD player should read the data from the compact disk. In the illustrative example above, the CD player only reads the data from the compact disk when the signals C1 and C2 are equal to prevent the CD player 34 from reading the data from the compact disk when the apparatus is only operating in the TV mode.

The video signal processor 36 selectively receives the video signal V1 output from television signal receiver 32 or the video signal V2 output from the of compact disk player 34. The processor 36 processes the received signal and displays the processed signal on a monitor 10.

Similarly, the audio signal processor 38 selectively receives the audio signal A1 from television signal receiver 32 or an audio signal comprising the audio signal A2 from compact disk player 34. The received audio signal is processed and output as sound via a pair of audio converters such as the speakers 12.

The power source 40 receives AC power and generates various power signals to be supplied to various components of the CDP-incorporated television receiver. For example, the power source 40 outputs a power signal Vtv to the television signal receiver 32, a monitor heating voltage signal Vm to the monitor 10, and a power signal Vcd to the CD player 34.

The television controller 42 controls the supply of power and other signals to the various components based on control signals input via the control panel 26 or the remote controller 27. For example, as described below, when the television controller 42 is commanded to reproduce audio signals from an audio compact disk, the controller 42 outputs a power control signal PW to command the power source 80 to turn on the monitor 10 for displaying on-screen characters stored on the CD and to turn off the monitor 10 after predetermined length of time.

An example of the detailed configuration of the television signal receiver 32, the CD player 34, the video signal processor 36, the audio signal processor 38, the power source 40, and the television controller 42 is described below.

The television signal receiver 32 comprises a second signal processor 76 which is selectively tuned to a particular television broadcasting channel according to tuning data TD received from the television controller 42. The processor 76 receives and demodulates a television signal received on the tuned channel and generates video and audio signals based on the received signal. The receiver 32 also comprises a first switch 74 for selectively receiving the video signal output from the second signal processor 76 or one of the externally input video signals V11, V12 and S-VHS. The selected video signal is then output by the first switch 74 as the video signal V1.

The video signal processor 36 comprises a second switch 44 which selectively inputs the video signal V1 of television signal receiver 32 or a video signal V2 output from the compact disk player 34. The signal processor 36 also comprises a video processor 46 for inputting the selected signal from the second switch 44 and for converting the signal into an RGB signal. The RGB signal is output to a monitor driver 48 which causes the monitor 10 to display the corresponding video image.

The video processor 46 includes a comb-filter 52, a selector 54, a first signal processor 56, and an RGB mixer 58. The comb-filter 52 inputs the video signal from the switch 44 and separates the signal into color and luminance signals Y and C. The selector 54 selectively inputs an S-VHS signal input from an external input and the separated signals Y and C and outputs the selected signals to the first signal processor 56. Subsequently, the processor 56 extracts the sync signal H/V, outputs the sync signal H/V to the television controller 42, converts the luminance and color signals Y and C to an RGB signal, and possibly mixes the RGB signal with an OSD signal output from the television controller 42. The resultant RGB signal is output to the RGB mixer 58 which mixes the RGB signal processed in the first signal processor 56 with an RGB signal supplied from the compact disk player 34 and which outputs the resultant RGB signal to the monitor driver 48.

The output of the second switch 44 is also output to a video output jack MV. Consequently, the selected video signal can also be output to and displayed on an external monitor (not shown).

The video signal processor 36 also contains a third switch 50 for selectively outputting the video signal V1 output from the video signal receiver 32 to an external video input EX of the compact disk player 34. As explained below, outputting the video signal V1 to the player 34 enables the visual lyric data stored on a compact disk to be superimposed over the video signal V1.

The audio signal processor 38 comprises a fourth switch 72 which selectively inputs the audio signal output by the television receiver 32 or one of the externally input audio signals A11, A12, and S-A. The selected audio signal A1 is output to an amplifier 60 for amplifying the signal A1 to a level ranging from $0.4V_{rms}$ to $2V_{rms}$. The audio signal A1 is amplified in order to unify the different levels of the audio signal A1 and a compact disk audio signal A2 output from the compact disk player 34. As a result, the necessity of volume regulation is eliminated. Also, each of the audio signals A1 and A2 are dual-channel (L/R) signals.

The audio signal processor 38 also comprises a microphone jack 14 to receive an external audio signal input via a microphone 15. The external audio signal is amplified by an audio input amplifier 68 and input to a mixer 70. The mixer 70 mixes the external signal from the microphone 15 with the audio signal A2 of compact disk player 34 to produce a mixed audio signal.

The signal processor 38 also includes a fifth switch 62 for selectively inputting the audio signal A1 from the amplifier 60 or the audio signal from the mixer 70. The selected audio signal is output to a surround processor 64 which stereophonically processes the selected signal. Subsequently, the processed signal is output to an audio output 66 which echo-processes the signal and drives the pair of speakers 12 to produce audio sound.

The output of fifth switch 62 is also supplied to an audio output jack MA. Thus, the selected audio signal can also be output to external devices such as external speakers (not shown).

The inputs to the video signal processor 36 and the audio signal processor 38 are controlled by the television controller 42. The controller 42 comprises a microprocessor 84, a remote control signal receiver 86, a control panel 26, and a remote controller 27.

A user can input instruction signals to the CDP-incorporated television receiver via an instruction input unit such as the control panel 26 or the remote controller 27. The input instruction signals are received by the remote control signal receiver 86, and the receiver 86 outputs corresponding control signals C2 to both the microprocessor 84 and compact disk player 34.

The microprocessor 84 inputs the control signals C2 from the signal receiver 86, control signals C1 from the CD player 34, and the sync signals H/V from the first signal processor 56 of the video processor 46. The microcomputer 84 processes the received signals C1, C2, and H/V and outputs various control signals based on such signals C1, C2, and H/V. For example, the microprocessor 84 outputs certain control signals C1 to the CD player 34, tuning data TD to tune the second signal processor 76 of the television receiver 32, OSD signals to the first signal processor 56, and/or switching control signals X1, X2, X3, X5, X6, and X4 for respectively controlling the first through fifth switches 74, 44, 50, 72 and 62 and selector 54.

The power source 40 receives commercial AC power and generates various power signals to turn on various components of the CDP-incorporated television receiver. For instance, the power source 40 comprises a first power source 78 for generating and supplying a standby power voltage SV to the microprocessor 84 of the television controller 42. Furthermore, the first power source 78 generates a primary power voltage and outputs such voltage to a television power source 80 and a CD power source 82. The television power source 80 converts the primary power voltage into several power voltages which can selectively turn on the television signal receiver 32, the video signal processor 36, and audio signal processor 38.

For example, the television power source 80 supplies a monitor heating voltage signal Vm to monitor 10. During the reproduction of sound stored on an audio compact disk, the monitor 10 only needs to be turned on when OSD characters or other images are to be displayed during the reproduction of such sound. Accordingly, when characters are not to be displayed during audio compact disk reproduction, the monitor 10 does not need to be used. Consequently, when the monitor 10 is used, the microprocessor 84 commands the television power source 80 to supply the monitor heating voltage signal Vm to the monitor 10. On the other hand, when use of the monitor 10 is unnecessary, the microprocessor 84 commands the television power source 80 to cease supplying the monitor heating voltage signal Vm. Therefore, turning the monitor 10 on and off via the monitor heating voltage signal Vm is controlled so that unnecessary current consumption is eliminated.

The CD power source 82 also inputs the primary power voltage from the first power source 78 and converts such voltage to a power voltage signal Vcd for turning on the CD player 34. The output of the signal Vcd is controlled by a power control signal PW output from the microprocessor 84 of television controller 42.

Figure 4:
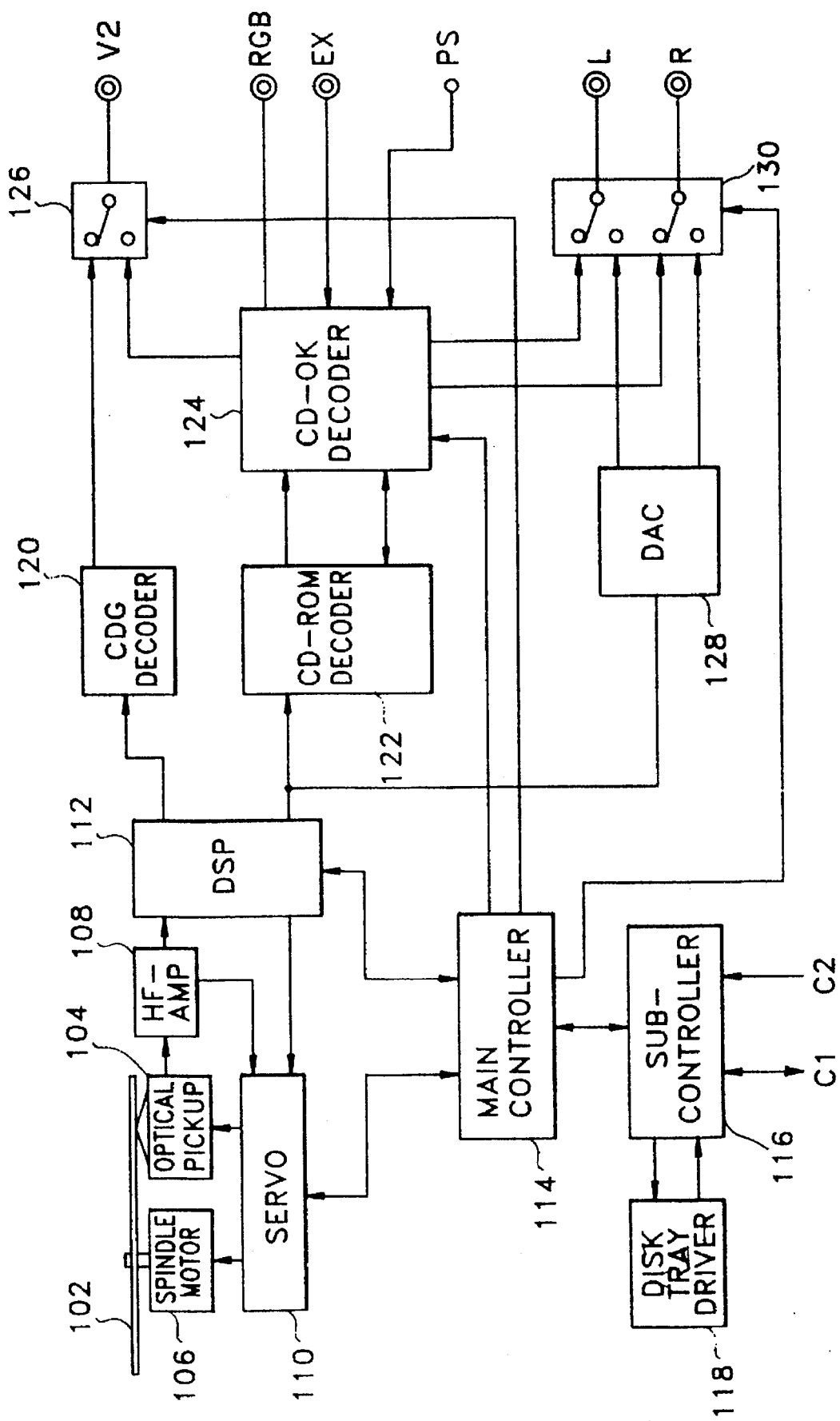
FIG. 4 is a circuit diagram of the compact disk player according to a preferred embodiment of the present invention shown in FIG. 3.

An example of a more detailed circuit diagram of the CD player 34 is illustrated in FIG. 4. As shown in the figure, the CD player 34 comprises a spindle motor 106 for rotating a compact disk 102 and an optical pickup 104 for reading information from the optical disk 102. The operation of the spindle motor 106 and the optical pickup 104 is controlled by a servo circuit 110.

The signal reproduced from the compact disk 102 via the optical head 104 is output to a digital signal processor (DSP) 112 via a high-frequency (HF) amplifier 108. The DSP 112 processes the signal and outputs a compact disk signal to a CD-ROM decoder 122 and to a digital-to-analog converter (DAC) 128.

If the compact disk 102 is a CD graphics (CDG) disk, a signal representing the sub-code of the compact disk 102 is output from the DSP 112 to the CDG decoder 120. Subsequently, the CDG decoder 120 converts the sub-code signal to an National Television System Committee (NTSC) -encoded graphics signal and outputs the encoded graphics signal as the video signal V2 via a video switch 126. As the sub-code signal is being output, the DSP 112 also outputs the compact disk signal to the DAC 128. The DAC 128 converts the digital compact disk signal into an analog audio signal and outputs the audio signal to an audio switch 130. Subsequently, the audio switch 130 outputs the analog signal to the audio processor 38 as a dual-channel signal via the L and R outputs.

If the compact disk 102 is a compact disk for a CD-OK apparatus (CD-OK disk), the CD-ROM decoder 122 decodes the compact disk signal and outputs the signal to a CD-OK decoder 124. The CD-OK decoder 124 generates RGB video data based on the decoded data to create a background screen to be displayed on the monitor 10. Furthermore, the decoder 124 decodes the lyric data stored on the CD-OK disk and superimposes the lyric data on the background screen as an RGB signal or as a video signal via an incorporated NTSC-encoder. Moreover, the CD-OK decoder 124 may also input an external video signal EX to be output with the superimposed lyric data to further enhance the output video signal. After the appropriate video signals have been generated and/or combined, the CD-OK decoder 124 outputs the video signal to the video signal processor 36 as the video signal V2 via the video switch 126.

The CD-OK decoder 124 also converts the decoded compact disk signal into audio musical instrument digital interface (MIDI) data as an accompaniment signal via an incorporated sound source integrated circuit. Subsequently, the CD-OK decoder 124 outputs the MIDI data to the audio switch 130, and the switch 130 outputs the signal to the audio processor 38 as a dual-channel signal via the L and R outputs.

Also, as shown in FIG. 3, a signal input through the microphone 15 is amplified by an amplifier 88 and input to a detector 90. The detector 90 converts the signal into a detection signal PS, and the signal PS is input by the CD-OK decoder 124. Subsequently, the decoder 124 may process the detection signal PS and output the signal PS along with the audio signal to the audio switch 130.

The CD player 34 also comprises a main controller 114 which controls the overall system including the switching of the video switch 126 and the audio switch 130. The player 34 also contains a sub-controller 116 which exchanges control signals C1 with the microprocessor 84 of television controller 42 and receives the second control signal C2 from remote control signal receiver 86 of the controller 42. The sub-controller 116 evaluates the first and second control signals C1 and C2 and determines that the remote control signal C2 is a proper command signal if the signal C2 is equal to the signal C1. If the control signal C2 is proper, the sub-controller 116 performs the corresponding commands. In addition, the sub-controller 116 also controls a disk tray driver 118 of the CD player 34.

The operation of the present invention having the aforementioned configuration will now be described.

Before the device is turned on, the first power source 78 of power source 40 receives commercial AC power and maintains the CDP-incorporated television receiver in a standby state by converting the AC power into the standby power voltage SV and supplying the voltage SV to the microprocessor 84 of the television controller 42. As a result, the microprocessor 84 waits until it receives a command from the remote control signal receiver 86. Subsequently, if a user presses the main power button 24 or inputs a power-on command via the remote controller 27, the microprocessor 84 commands the television power source 80 to supply the television power voltage Vtv to the television signal receiver 32, to the video signal processor 36, and to the audio signal processor 38.

The initial mode of the CDP-incorporated television receiver is always set to the "television mode". In other words, when the device is first turned on, the first and fourth switches 74 and 72 respectively input the video and audio signals output from the television signal receiver 32, and the second and fifth switches 44 and 62 respectively input the signals output from the switches 74 and 72. As a result, the video and audio signals output from the television signal receiver 32 are processed by the video signal processor 36 and the audio signal processor 34. In addition, the third switch 50 is open to prevent the video signal V1 output from the television signal receiver 32 from being input by the CD player 34.

If the user presses the CD power key on control panel 26 or a CD power key command is input via the remote controller 27, the microprocessor 84 outputs the power control signal PW to enable the CD power source 82, and the CD power source 82 supplies the power voltage Vcd to compact disk player 34. After being turned on, the compact disk player 34 reads the information stored in the read-in area of the compact disk 102 and transmits a control signal C1 corresponding to the disk type of the disk 102 to the microprocessor 84.

After evaluating the control signal C1, the microprocessor 84 changes the settings of the switches 44, 50, 54, 62, 72, and 74 depending on the type of disk 102 in the CD player 34. For instance, if the disk is a CD digital audio disk, the microprocessor 84 controls the switches 44, 50, 54, 62, 72, and 74 so that the CDP-incorporated television receiver operates in a "CD mode". Specifically, the microprocessor 84 outputs the switching control signal X6 to cause the fifth switch 62 to receive the output of the mixer 70. Furthermore, the microprocessor 84 generates the OSD character information relating to the disk 102 based on the control signal C1 and outputs the OSD information to the first signal processor 56 of the video signal processor 36. As a result, information relating to the contents of the disk 102 is displayed on the monitor 10 as OSD character information. Thus, the user can view the OSD information on the monitor 10 and can interactively control the CD player 34 by inputting commands via remote controller 27 or control panel 26.

Figure 5:
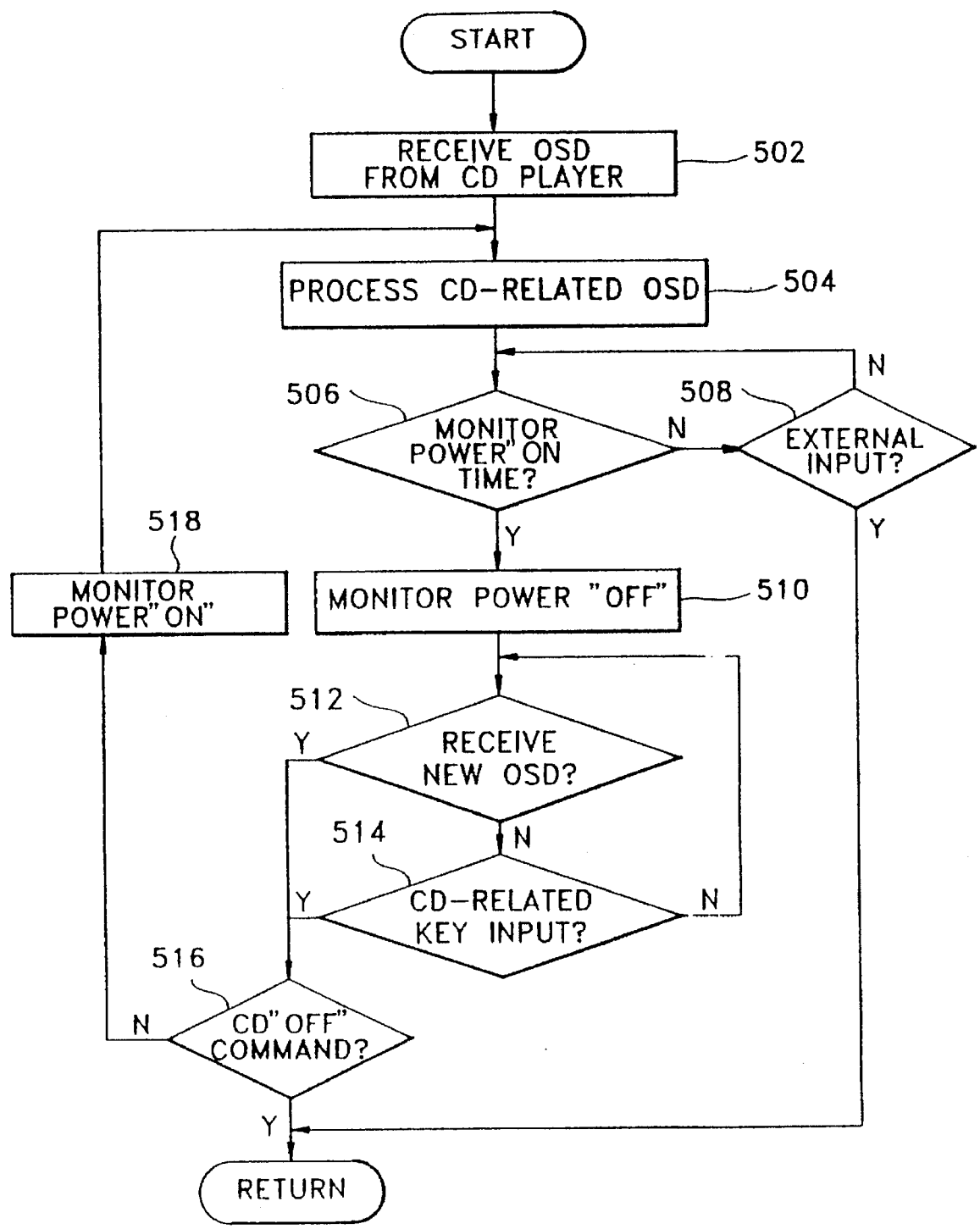
FIG. 5 is a flow chart for explaining the monitor power control function according to the present invention.

FIG. 5 shows a flow chart of the process of displaying OSD information relating to the contents of the compact disk 102 on the monitor 10. In particular, the microprocessor 84 of the television controller 42 receives the OSD information from the CD player 34 via the control signal C1 (step 502). Subsequently, the microprocessor 84 processes the OSD information, and the information is displayed on the monitor 10 (step 504). Then, the microprocessor 84 determines how long the monitor 10 has been "on" (step 506). If the monitor 10 has not been "on" for more than a predetermined length of time, the microprocessor 84 determines whether or not the user has input an external command via the remote controller 27 or the control panel 26 (step 508). If a command has not been input, step 506 is executed again. If a command has been input, the process returns to a main program for processing the particular command.

In step 506, if the monitor has been on for more than a predetermined length of time and the user has not input a command, the microprocessor 84 causes the television power source 80 to stop outputting the monitor heating voltage signal Vm, and the monitor 10 is turned off (step 510). Subsequently, the microprocessor 84 determines whether or not it has received new OSD information relating to the compact disk 102 (step 512). If new OSD character information has not been received, the microprocessor 84 ascertains whether or not a CD-related command has been input by the user (step 514). If such a command has not been input, step 512 is executed again.

If new OSD information has been received in step 512 or if a CD-related command has been input in step 514, the microprocessor 84 determines whether a CD "off" command has been input by the user (step 516). If such a command has been received, the process is returned to the main program for executing the command. If such a command has not been input, the microprocessor 84 causes the television power source 80 to supply the monitor heating voltage signal Vm to the monitor 10 to turn the monitor 10 "on" (step 518). Subsequently, the new CD-related OSD information is processed by the microcomputer 84 and displayed on the monitor 10 (step 504), and the procedure above is repeated.

As illustrated above, when reproducing information from an audio compact disk, the monitor 10 is turned on only when OSD information relating to the compact disk is to be displayed on the monitor 10. Furthermore, after the OSD information is displayed, if the monitor remains "on" for more than a predetermined length of time, the monitor 10 is automatically turned off, thereby reducing unnecessary current consumption.

If a CDG disk or a CD-OK disk is inserted in the CD player 34, the microprocessor 84 outputs the switching control signal X2 such that the switch 44 inputs the video signal V2 from the CD player 34. As a result, the video signal processor 36 processes the video signal V2. Furthermore, the microprocessor 84 outputs the control signal X6 so that the switch 62 inputs the audio signal output from the mixer 70.

If a CD-OK disk is used for a song accompaniment function, the CD-OK decoder 124 generates a still background screen based on data stored on the CD-OK disk. The CD-OK decoder 124 outputs the background screen as the video signal V2 via the video switch 126, and the video signal V2 is input by the video signal processor 36 via the switch 44. Alternatively, the background screen may be output to the first signal processor 56 as an RGB signal. Subsequently, the background screen is displayed on the monitor 10.

On the other hand, the user can change the background screen displayed on the monitor 10 by pressing the background selection key on control panel 26 or the remote controller 27. As a result, the microprocessor 84 outputs the switching control signal X3 to turn the third switch 50 "on". As a result, the video signal V1 output by the television signal receiver 32 is input to the CD-OK decoder 124 via the external input EX. The video signal V1 is then output by the CD-OK decoder 124 to the video signal processor 36 via the video switch 126 and the second switch 44. Thus, the signal V1 output by the television signal receiver 32 can be selected as the background screen to accompany the song reproduced by the CD-OK disk.

Also, the background picture can be generated by an external video source such as a video camera or video cassette recorder. Specifically, the video output port of the external video source can be connected to one of the external video input ports V11, V12, or S-VHS of the first switch 74 of the television signal receiver 32. Then, the microprocessor 84 can be commanded to output the switching control signal X1 such that the first switch 74 selects the appropriate input port V11, V12, or S-VHS. Consequently, the television signal receiver 32 outputs the signal from the external video source as the video signal V1.

The video signal V1 is then input by the CD player 34 via its input port EX, and the CD-OK decoder 124 superimposes internally generated lyric information on the video signal V1. Subsequently, the combined signal is output from the CD-OK decoder 124 as the video signal V2 via the video switch 126, and the video signal processor 36 displays the video signal V2 on the monitor 10. Also, compact disk player 34 may generate an RGB signal to be displayed on monitor 10 via the RGB mixer 58 of the video processor 46.

In order to minimize current consumption, if CDP-incorporated television receiver is not operating in the CD mode, the microprocessor 84 instructs the CD power source 82 to cease outputting the power voltage Vcd. Consequently, the CD player 34 is turned off, and the amount of current consumed by the CDP-incorporated television receiver is reduced.

According to the present invention, a television set and CD song accompaniment set are incorporated in one device. Therefore, the system is significantly more convenient to use than a system constructed of several non-integrated components. Furthermore, since the components of the system are integrated and centrally controlled, many different background screens can be easily generated during a song accompaniment function, and the amount of power consumed by each separate component can be substantially reduced.

What is claimed is:

1. A compact disk player (CDP)-incorporated television receiver comprising:

a) a television signal receiver,
   wherein said television receiver receives at least a television signal and extracts first audio and video signals from at least said television signal, and
   wherein said television receiver outputs said first audio and video signals;

b) a compact disk player having a song accompaniment function,
   wherein said compact disk player receives a first control signal from a television controller, receives a second control signal from an instruction input unit, and outputs a third control signal to said television controller,
   wherein said compact disk player determines if said first and second control signals respectively equal certain values, and
   wherein said compact disk player reads data from a compact disk (CD) and outputs second audio and video signals if said first and second control signals respectively equal said certain values;

c) a video signal processor,
   wherein said video signal processor selectively receives said first video signal from said television signal receiver or said second video signal from said compact disk player as a received video signal, processes said received video signal into a final RGB signal, and displays said final RGB signal on a monitor;

d) an audio signal processor,
   wherein said audio signal processor selectively receives said first audio signal from said television signal receiver or a certain audio signal as a received audio signal, processes said received audio signal into a processed audio signal, and outputs said processed audio signal via a sound converter, and wherein said certain audio signal comprises at least said second audio signal from said compact disk player;

e) a power source, wherein said power source receives AC power and generates a television power voltage signal for turning on said television signal receiver, a monitor heating voltage signal for turning on said monitor, and a compact disk power voltage signal for turning on said compact disk player; and f) said television controller, wherein said television controller controls an output of said television power voltage signal to said television signal receiver, said monitor heating voltage signal to said monitor, and said compact disk power voltage signal to said compact disk player based on whether said CDP-incorporated television receiver is operating in a television mode or a compact disk mode, wherein said CDP-incorporated television receiver operates in said television mode or said compact disk mode in response to a fourth control signal input via said instruction input unit, wherein said third control signal input by said television controller from said compact disk player conveys information including on-screen character data relating to a compact disk read by said compact disk player, wherein said monitor is turned on by said monitor heating voltage signal when an audio compact disk is read by said compact disk player and wherein said television controller outputs said on-screen character data relating to said audio compact disk to said video signal processor so that said on-screen character data is displayed on said monitor, and wherein said television controller turns off said monitor by commanding said power source to stop outputting said monitor heating voltage signal if said on-screen character data has been displayed for a predetermined period of time.

2. The CDP-incorporated television receiver of claim 1, wherein:

said television controller controls whether said video signal processor selectively receives said first or second video signal, and said television controller controls whether said audio signal processor receives said first audio signal or said certain audio signal.

3. The CDP-incorporated television receiver of claim 2, wherein:

said television receiver commands said video signal processor to receive said first video signal and commands said audio signal processor to receive said first audio signal when said CDP-incorporated television receiver is operating in said television mode, and said television receiver commands said video signal processor to receive said second video signal and commands said audio signal processor to receive said certain audio signal when said CDP-incorporated television receiver is operating in said compact disk mode.

4. The CDP-incorporated television receiver of claim 1, wherein:

said television controller turns on said compact disk player during said compact disk mode by causing said power source to output said compact disk power voltage signal, and said television controller turns off said compact disk player when said CDP-incorporated television receiver is not operating in said compact disk mode by commanding said power source not to output said compact disk power voltage signal.

5. The CDP-incorporated television receiver of claim 1, wherein:

said television controller determines if a command is input via said instruction input unit while said monitor is displaying said on-screen character data, and said television controller executes said command if said command is input.

6. The CDP-incorporated television receiver of claim 1, wherein:

said television controller determines if new on-screen character data has been received from said compact disk player if said monitor has been turned off after said on-screen character data has been displayed for a predetermined period of time, and said television controller causes said power source to output said monitor heating voltage signal to turn on said monitor to display said new on-screen character data if said new on-screen character data has been received.

7. The CDP-incorporated television receiver of claim 1, wherein said compact disk player comprises:

an optical pickup for reading data from said compact disk;

a digital signal processor (DSP) for processing said data read from said compact disk and for selectively outputting a corresponding CD signal and a sub-code signal;

a CD-graphics (CDG) decoder for inputting said sub-code signal and outputting a corresponding first CD video signal;

a CD-ROM decoder for inputting said CD signal and outputting a corresponding decoded CD signal;

a digital-to-analog converter (DAC) for converting said CD signal to a first CD audio signal;

a CD song accompaniment (CD-OK) decoder for decoding said decoded CD signal and selectively outputting a corresponding second CD video signal and a second CD audio signal;

a video switch for selectively inputting said first CD video signal and said second CD video signal and outputting said second video signal; and an audio switch for selectively inputting said first CD audio signal and said second CD audio signal and outputting said second audio signal.

8. The CDP-incorporated television receiver of claim 7, wherein said video switch inputs said first CD video signal from said CDG decoder and said audio switch inputs said first CD audio signal when a CD graphics disk is being played by said compact disk player.

9. The CDP-incorporated television receiver of claim 7, wherein said video switch inputs said second CD video signal from said CD-OK decoder and said audio switch inputs said second CD audio signal when a CD-OK disk is being played by said compact disk player.

10. The CDP-incorporated television receiver of claim 7, wherein said video signal processor further comprises:

a second switch for selectively inputting said first video signal or said second video signal and outputting said received video signal;

a video processor for processing said received video signal into said final RGB signal;

a monitor driver for inputting said final RGB signal and causing said monitor to display said final RGB signal.

11. The CDP-incorporated television receiver of claim 10, wherein said video processor further comprises:

a comb-filter for inputting said received signal from said second switch and for separating said received signal into color and luminance signals; and a first signal processor for converting said color and luminance signals into a first RGB signal, wherein said final RGB signal comprises at least said first RGB signal.

12. The CDP-incorporated television receiver of claim 11, wherein:

said video processor further comprises an RGB mixer which inputs said first RGB signal;

said CD-OK decoder generates a second RGB signal as a first background signal and outputs said first background signal to said RGB mixer, said RGB mixer mixes said first RGB signal with said first background signal to produce said final RGB signal, and said monitor driver inputs said final RGB signal and causes said monitor to display said final RGB signal.

13. The CDP-incorporated television receiver of claim 12, wherein said video processor further comprises:

a third switch connected between said television signal receiver and an external input of said CD-OK decoder, wherein said third switch inputs said first video signal and selectively outputs said first video signal to said external input, and wherein said CD-OK decoder inputs said first video signal as a second background signal, superimposes said decoded CD signal on said second background signal to form said second CD signal, and outputs said second CD signal to said video switch to be output as said second video signal.

14. The CDP-incorporated television receiver of claim 13, wherein:

said television controller controls whether said CD-OK decoder outputs said first background signal to said RGB mixer or whether said CD-OK decoder combines said second background signal with said decoded CD signal by opening or closing said third switch, and said television controller opens or closes said third switch according to a background selection command input from said instruction input unit.

15. The CDP-incorporated television receiver of claim 10, wherein said second switch also outputs said received video signal to a video output jack.

16. The CDP-incorporated television receiver of claim 10, wherein said television controller controls a position of said second switch.

17. The CDP-incorporated television receiver of claim 1, wherein said audio signal processor comprises:

a mixer, wherein said mixer inputs a microphone signal input via a microphone and said second audio signal from said compact disk player and wherein said mixer mixes said microphone signal and said second audio signal to form said certain audio signal;

a fifth switch for selectively inputting said first audio signal and said certain audio signal and outputting said received audio signal.

18. The CDP-incorporated television receiver of claim 17, wherein said audio signal processor further comprises:

a fourth switch connected between said television signal processor and said fifth switch, wherein said fourth switch selectively inputs said first audio signal and an external audio input and wherein said fourth switch outputs said first audio signal or said external audio input to said fifth switch.

19. The CDP-incorporated television receiver of claim 18, wherein said fifth switch also outputs said received audio signal to an audio output jack.

20. The CDP-incorporated television receiver of claim 18, wherein said television controller controls a position of said fourth switch.

21. The CDP-incorporated television receiver of claim 17, wherein said television controller controls a position of said fifth switch.

22. The CDP-incorporated television receiver of claim 1, wherein said television signal receiver comprises:

a second signal processor for receiving said television signal;

a first switch connected to said second signal processor and an external video input, wherein said first switch selectively inputs said television signal and said external video input and wherein said first switch outputs said television signal or said external video input as said first video signal.

23. The CDP-incorporated television receiver of claim 22, wherein said television controller controls a position of said first switch.

24. The CDP-incorporated television receiver of claim 1, wherein said first an second control signals respectively equal said certain values when said first control signal equals said second control signal.

* * * * *